United States Patent [19]

Eckberg

[11] Patent Number: 5,082,871
[45] Date of Patent: Jan. 21, 1992

[54] UV-ACTIVATION OF ADDITION CURE SILICON COATINGS

[75] Inventor: Richard P. Eckberg, Saratoga Springs, N.Y.

[73] Assignee: General Electric Company, Waterford, N.Y.

[21] Appl. No.: 445,902

[22] Filed: Dec. 4, 1989

Related U.S. Application Data

[63] Continuation of Ser. No. 945,414, Dec. 22, 1986, abandoned.

[51] Int. Cl.$^5$ .................. C08G 77/20; C08G 77/06; C08G 77/12
[52] U.S. Cl. .................. 522/29; 522/30; 522/99; 528/15; 528/31; 528/32
[58] Field of Search .............. 522/29, 30, 99; 528/15, 528/31, 32

[56] References Cited

U.S. PATENT DOCUMENTS 4,347,346 8/1982 Eckberg .................. 528/15
4,640,939 2/1987 Cavezzan .................. 522/99

Primary Examiner—Marion E. McCamish
Assistant Examiner—Susan Berman

[57] ABSTRACT

There is provided a platinum catalyzed addition curable polyorganosiloxane release coating composition containing a dialkylacetylenedicarboxylte inhibitor for preventing premature gellation at ambient temperatures but which will cure upon ultraviolet light exposure via a hydrosilation reaction to form a coating capable of releasing materials from substrates which would normally adhere thereto.

8 Claims, No Drawings

UV-ACTIVATION OF ADDITION CURE SILICON COATINGS

This application is a continuation of application Ser. No. 06/945,414, filed Dec. 22, 1986, now abandoned.

The present invention relates to the ultraviolet light activated cure of certain silicone coatings. More particularly, the present invention relates to the ultraviolet light activated cure of platinum catalyzed, addition cured silicone coatings which contain dialkylacetylenedicarboxylate inhibitors.

BACKGROUND OF THE INVENTION

Silicone compositions which are curable by reaction of ≡SiH groups with silicon-bonded olefinic groups in the presence of a hydrosilation catalyst are well known in the art, for example, as described in U.S. Pat. Nos. 2,823,218; 3,249,581 and 3,436,366, all of which are incorporated by reference into the present disclosure. Because curing begins upon mixing of the aforesaid ingredients, it is the usual practice to provide addition curable compositions in two packages, one of which contains the olefinically unsaturated polysiloxane and the hydrosilation catalyst, and the other the organohydrogenpolysiloxane crosslinking agent.

When it is necessary to extend the pot life of addition curable organopolysiloxane compositions or provide one-component addition curable organopolysiloxane composition, a cure inhibitor can be included therein. Generally, cure inhibitors are compounds which slow curing at ambient temperatures but do not retard curing at elevated temperatures. Such cure inhibitors are heat deactivated cure inhibitors, or are sufficiently volatile to be expelled from coating compositions at elevated temperature.

Particular heat deactivated cure inhibitors are the dialkylacetylenedicarboxylates. These inhibitors are disclosed in U.S. Pat. No. 4,347,346, to the instant inventor, and are described by the formula, ROOCC≡CCOOR, where R is a monovalent hydrocarbon radical.

It is an object of the present invention to provide platinum catalyzed, addition cured silicone coating compositions containing dialkylacetylenedicarboxylate inhibitors which are curable with ultraviolet light.

It is a further object of the present invention to provide a method to cure platinum catalyzed, addition curable silicone coating compositions containing dialkylacetylenedicarboxylate inhibitors which contains the step of exposing the coating composition to ultraviolet light.

SUMMARY OF THE INVENTION

The present invention provides a silicone composition containing a dialkylacetylenedicarboxylate inhibitor agent which is effective for retarding a platinum metal catalyzed addition cure hydrosilation reaction at room temperature but which will effectively cure upon exposure to ultraviolet radiation thereby forming a silicone coating which will tenaciously adhere to a substrate such as paper to which it is applied but will render said substrate substantially nonadherent to materials such as pressure sensitive adhesives which would normally adhere thereto.

The release coating composition of the present invention is comprised of:

a. an olefinorganopolysiloxane having structural units of the formula:

$$R_aR_b'SiO_{(4-a-b)/2} \quad (I)$$

and b. an organohydrogenpolysiloxane having structural units of the formula:

$$R_aH_bSiO_{(4-a-b)/2} \quad (II)$$

wherein R is an organic radical attached to silicon by a C—Si linkage and is selected from the group consisting of monovalent hydrocarbon radicals, halogenated monovalent, hydrocarbon radicals, and cyanoalkyl radicals; generally, R contains from 1-30 carbon atoms, straight or branched chained, preferably from 1-12 carbon atoms, and most preferably 1-8 carbon atoms; R' is an olefinic hydrocarbon radical attached to silicon by a C—Si linkage and generally contains from 1-20 aliphatic carbons, straight or branch chained, and preferably 1-12 carbon atoms, linked by multiple bonds (e.g., vinyl, allyl, methallyl, butenyl, pentenyl, ethenyl and the like); a has a value of 0 to 3, inclusive, and preferably from 0.5 to about 2, inclusive, b has a value from 0.005 to 2.0, inclusive, and the sum of a and b is equal to from 0.8 to 3, inclusive, wherein the release coating composition is a fluid at room temperature having a viscosity of, approximately, 25 to 5000 centipoise and preferably 300 to 1000 centipoise at 25° C., c. a sufficient amount of platinum metal catalyst, to cause the co-reaction of (a.) and (b.), and d. an amount of dialkylacetylenedicarboxylate effective for inhibiting an addition cure hydrosilation reaction between said olefinorganopolysiloxane and said organohydrogenpolysiloxane. The dicarboxylate has the general formula ROOCC≡CCOOR where R is as defined above and is present in an amount to inhibit premature gelation of the catalyzed co-reaction product of (a.) and (b.) but is present in an amount insufficient to prevent curing of said coating composition upon exposure to ultraviolet radiation.

DESCRIPTION OF THE INVENTION

The composition of the present invention is particularly well suited for rendering materials nonadherent to other normally adherent materials such as glue and adhesives. Additionally, the composition can be applied directly to a substrate without the need for a solvent, thus avoiding all of the problems associated with coating solvents as described above.

The composition is an organopolysiloxane made up of several constituent ingredients which will adhere to and thermally cure on the substrate upon which it is coated, and render the substrate nonadherent.

The olefinorganopolysiloxanes having structural units represented by Formula I hereinabove are intended to broadly cover low viscosity fluid organopolysiloxanes suitable for coating which preferably, but not necessarily, are free of silanic hydrogen, and contain olefinic unsaturation by means of double or triple bonds between two adjacent aliphatic carbon atoms. Among the radicals which R represents in Formula I hereinabove are included alkyl, such as methyl, ethyl, propyl, isopropyl, butyl, octyl, dodecyl, and the like; cycloalkyl, such as cyclopentyl, cyclohexyl, cyclopeptyl, and the like; aryl, such as phenyl, naphthyl, tolyl, xylyl, and the like; aralkyl, such as benzyl, phenylethyl, phenylpropyl, and the like; halogenated derivatives of the aforesaid radicals including chloromethyl, trifluoromethyl, chloropropyl, chlorophenyl, dibromophenyl, tetrachlorophenyl, difluorophenyl, and the like; and cyanoalkyl, such as beta-cyano ethyl, gamma-cyanopropyl, beta-cyanopropyl and the like. Preferably R is methyl. Moreover, Formula I is intended to include those materials wherein R is a mixture of the aforesaid radicals.

Among the radicals represented by R' in Formula I hereinabove are included alkenyl, such as vinyl, allyl, methallyl, butenyl, pentenyl, and the like; and alkynyl, such as ethynyl, propynyl, butynyl, pentynyl and the like. Preferably R' is vinyl or allyl and most preferably R' is vinyl.

These olefinorganopolysiloxanes encompassed within the scope of Formula I hereinabove are well known in the art, as particularly manifested by U.S. Pat. No. 3,344,111 to Chalk, and U.S. Pat. No. 3,436,366 to Modic, which are incorporated herein by reference. Similarly, their preparation and commercial availability is also well known.

The olefinorganopolysiloxanes encompassed within the scope of the present invention can be characterized as copolymers of (1) siloxane units having the formula:

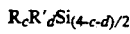  (IV)

where R and R' are as defined above and c has a value of from 0 to 2, inclusive, and the sum of c and d is equal to from 0.8 to 3.0, inclusive, and (2) organosiloxane units having the structural formula:

  (V)

where R is as defined above and n has a value of from 0.8 to 2.5, inclusive. Thus, where the olefinorganopolysiloxane employed herein is a copolymer of units within the scope of Formula IV with an organopolysiloxane having an average formula within the scope of Formula V, the copolymer generally contains from 0.5 to 99.5 mole percent of the units of Formula IV, and from 0.5 to 99.5 mole percent of units within the scope of Formula V. The preparation of these copolymers is also well known in the art. A major proportion of the composition is typically a vinyl chainstopped polysiloxane having the general formula:

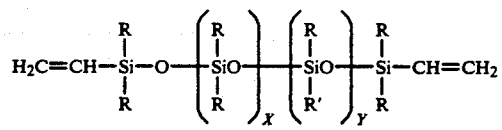

wherein R is a monovalent hydrocarbon radical free of unsaturation. Suitable radicals for R include, for example, methyl, ethyl, propyl, butyl, and other similar unsaturated hydrocarbons, but ordinarily would not include phenyl groups for paper release purposes. R' is a hydrocarbon radical having alkenyl unsaturation. Typically, R' represents vinyl groups but may also represent allylic or cycloalkenyl unsaturated groups. X and Y are positive integers so that the vinyl chainstopped polysiloxane has up to approximately 20% by weight of R' groups. The viscosity of such a polysiloxane ranges from approximately 50 to approximately 100,000 centipoise at 25° C. Preferably, the vinyl chainstopped polysiloxane has up to approximately 20% by weight of vinyl groups represented by R' and the viscosity of this polymer ranges from approximately 300 to approximately 550 centipoise at 25° C. The preferred vinyl chainstopped polysiloxane has the general formula:

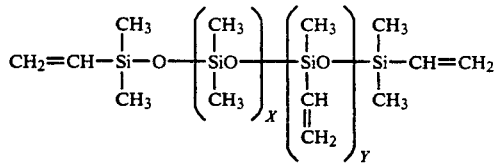

wherein X and Y are as described above.

Methylhydrogen fluid is often used by those skilled in the silicone art as a crosslinking agent for addition-cured silicone systems. Particularly useful as a crosslinking agent for the present invention is a trimethyl chainstopped polymethylhydrogen siloxane fluid having from approximately 10% to approximately 100% SiH groups with the remainder being essentially dimethylsiloxy units and having a viscosity in the range of approximately 25 to approximately 1,000 centipoise at 25° C.

The organohydrogenpolysiloxanes having structural units represented by Formula II hereinabove are intended to broadly cover fluid organopolysiloxanes which are preferably, but not necessarily, free of olefinic unsaturation, but which contain silanic hydrogen. These organohydrogenpolysiloxanes represented by Formula II hereinabove are also well known in the art as particularly manifested by U.S. Pat. No. 3,344,111 to Chalk, and U.S. Pat. No. 3,436,366, incorporated herein by reference.

Among the radicals represented by R in Formula II, hereinabove, similarly to R in Formula I hereinabove, are included alkyl, such as methyl, ethyl, propyl, isopropyl, butyl, octyl and the like; cycloalkyl, such as cyclopentyl, cyclohexyl, cycloheptyl and the like; aryl, such as phenyl, naphthyl, tolyl, xylyl, and the like, aralkyl, such as benzyl, phenylethyl, phenylpropyl, and the like; halogenatged derivatives of the above radicals, including chloromethyl trifluoromethyl, chloropropyl, chlorophenyl, dibromophenyl, tetrachlorophenyl, difluorophenyl and the like; and cyanoalkyl, such as beta-cyanoethyl, gamma-cyanopropyl, beta-cyanopropyl and the like. Also intended to be included within the scope of Formula II are those materials where R is a mixture of the aforesaid radicals. Preferably the R group of Formula II is methyl.

Materials specifically encompassed within Formula II hereinabove, include 1,3-dimethyldisiloxane, 1,1,3,3,-tetramethyldisiloxane, as well as higher polymers containing up to 100,000 or more silicon atoms per molecule. Also included within the scope of Formula II hereinabove are cyclic materials, such as cyclic polymers of methyl hydrogen siloxane having the formula:

wherein x is a whole number equal to from 3 to 10 or more. Particularly included is tetramethylcyclotetrasiloxane.

The organohydrogenpolysiloxanes employed in the practice of the present invention can also be characterized as copolymers containing at least one unit per molecule having the formula:

  (VI)

with the remaining siloxane units in the organopolysiloxane being with in the scope of Formula V hereinabove, where R, c, d and n are defined above.

Within the scope of Formula VI are siloxane units, such as hydrogen siloxane units $(H_2SiO)_{1.5}$, methyl hydrogen siloxane units $(HSiCH_3O)$, dimethyl hydrogen siloxane units, and dihydrogen siloxane units $(H_2SiO)$. In these copolymers, the siloxane units of Formulae V and VI are present in proportions so as to form a hydrogenpolysiloxane within the scope of Formula II hereinabove. In general, these copolymers contain from 0.5 to 99.5 mole percent of the siloxane units of Formula V with from 0.5 to 99.5 mole percent of the siloxane units of Formula VI.

Ordinarily for release coating purposes it is preferred that the organohydrogenpolysiloxane crosslinker be essentially a trimethyl chainstopped methylhydrogenpolysiloxane fluid having a viscosity of, approximately, 10 to 500 centipoise at 25° C. and a hydrogen content of, approximately, 0.1 to 1.67 weight percent.

The precious metal catalyst component employed in the compositions of the present invention includes all of the well known platinum-metal catalysts which are effective for catalyzing the reaction between silicon-bonded hydrogen groups and silicon-bonded olefinic groups, and which are freely miscible in solvent-free silicone polymers. These materials include, for example, the platinum hydrocarbon complexes shown in U.S. Pat. No. 3,159,601 to Ashby and U.S. Pat. No. 3,159,662 to Ashby, as well as the platinum alcoholate catalysts described in U.S. Pat. No. 3,220,972 to Lamoreaux. Moreover, the platinum chloride-olefin complexes described in U.S. Pat. No. 3,516,946 to Modic are also useful herein. All of the aforesaid U.S. Patents are intended to be incorporated herein by reference.

Small amounts of dialkylacetylenediacraboxylate inhibitor permit exceptionally long catalyzed pot-life without sacrifice of cure performance in a solventless paper release system. Ordinarily, the effective amount of inhibitor ranges from approximately 0.05% to approximately 1.0% by weight, and preferably from 0.1 to 0.25% by weight. Use of the inhibitor of the present invention results in adequate pot-life yet the composition rapidly cures to a smear-free and migration-free nonadherent surface when cured with ultraviolet light.

Dialkylacetylenedicarboxylates result from the diesterification reaction of 2-butynoic dicarboxylic acid with two equivalents of alcohols such as methanol, ethanol, butanol, benzylic alcohol, allyl alcohol or mixtures of such alcohols. Such reactions can be represented as:

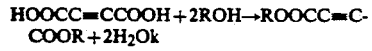

or

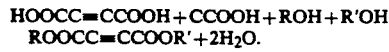

Useful diesters prepared in this fashion include dimethylacetylenedicarboxylate, diethylacetylenedicarboxylate, dibutylacetylenedicarboxylate, methylbutylacetylenedicarboxylate, methylethylacetylenedicarboxylate, etc. Particularly useful for the practice of the present invention are those diesters where R represents methyl or ethyl groups.

Effective levels of dimethylacetylenedicarboxylate are quite soluble in silicone fluids, and it is not significantly volatile, having a boiling point above 200° C. at atmospheric pressure. Additionally, dimethylacetylenedicarboxylate is readily available commercially. Furthermore, inasmuch as the total inhibitor concentration in the dimethylacetylenedicarboxylate-inhibited polysiloxane in quite low, the total cost is significantly reduced. Additionally, the small inhibitory amounts of dimethylacetyl- enedicarboxylate utilized by the present invention will be substantially wholly included within the crosslinked polymer. Thus free dimethylacetylenedicarboxylate is not extant after the polymeric composition is cured.

Dimethylacetylenedicarboxylate will also effectively inhibit the platinum catalyzed condensation cure reaction for polysiloxane compositions having silanol functionality as well as inhibit the cure for those compositions exhibiting both silanol and vinyl functionality. A base polymer for such a composition can be, for example, a silanol chain-stopped polydiorganosiloxane having pendant vinyl groups along the siloxane chain.

The ingredients described above may be mixed in any order and exposed to ultraviolet radiation for cure. Persons skilled in the art are familiar with ultraviolet light cure and are easily able to determine proper spectrum, flux and exposure time to obtain the cure.

A preferred use of the above described composition is as a release coating on a substrate. The composition is mixed, applied as a thin film on a substrate, and cured by exposure to ultraviolet light. The substrate may be nonporous, i.e. glass, plastic metal foil, etc., but is preferably porous, such as, paper and other fibrous materials.

In order that those skilled in the art might be better able to practice the present invention, the following examples are given by way of illustration and not by way of limitation.

DESCRIPTION OF THE PREFERRED EMBODIMENTS

EXAMPLE 1

A 500 centipoise vinyl-stopped linear polydimethylsiloxane fluid was blended with various amounts of a Karstedt platinum catalyst and dimethylacytylenedicarboxylate (DIMAC). Within two minutes of mixing, an intense orange-yellow color was generated in each of the compositions. Table I shows the compositions which were blended and their contents.

TABLE 1

| Composition | Pt. conc., ppm | DIMAC conc., ppm | Mole Ratio, Pt/DIMAC |
|---|---|---|---|
| 1 | 25 | 1000 | 1/55 |
| 2 | 25 | 250 | 1/13.7 |
| 3 | 40 | 200 | 1.6/11 |
| 4 | 50 | 200 | 2/11 |

EXAMPLE 2

A 400 centipoise vinyl-stopped, dimethyl, methylvinyl, linear silicone polymer with 3.7 wt. % $D^{Vi}$ units was blended with various amounts of a Karstedt platinum catalyst and dimethylacetylenedicarboxylate (DIMAC). Within two minutes of mixing, an intense orange-yellow color was generated in each of the compositions. Table II shows the compositions which were blended and their contents.

TABLE II

| Composition | Pt. conc., ppm | DIMAC conc., ppm | Mole Ratio Pt/DIMAC |
|---|---|---|---|
| 5 | 50 | 200 | 2/11 |
| 6 | 100 | 300 | 4/16.5 |

EXAMPLE 3

Each of compositions 1–6 were blended with a 350 centipoise linear, trimethyl siloxy-stopped, poly(-dimethyl-methylhydrogen)siloxane with 50 wt % $D^H$ units present in a weight ratio of 9 to 1. The resultant bath compositions 1–6 were coated on to aluminum Q panels, polypropylene film, or 40#/ream SCK paper substrates. The coated substrates were exposed in an oven or in air to ultraviolet light as shown in Table III.

TABLE III

| Comp. | Substrate | Coating Thickness Mil | UV-Exposure, J/cm$^2$ | Oven Conditions min/°C. | Qualitative Results |
|---|---|---|---|---|---|
| 1 | paper | 2 | 1.5 | — | Cured; no smear, no migration, good anchorage |
| 1 | aluminum | 2 | 4.5 | — | Cured; no smear, no migration, good anchorage |
| 1 | paper | **thin film | 1.5 | — | Cured; no smear, no migration, good anchorage |
| 1 | aluminum | 2 | — | 5/80 | Cured; no smear, no migration, good anchorage |
| 1* | paper | 4 | 1.5 | — | Exposed areas cured shadowed areas wet. |
| 2 | paper | thin film | 1.15 | — | Cured; no migration, slight smear |
| 2 | paper | thin film | — | 1.5/80 | Cured; no migration, slight smear |
| 3 | paper | thin film | 0.6 | — | Cured; no migration, slight smear |
| 3 | paper | thin film | 0.48 | — | Undercured, migrates |
| 3 | paper | thin film | — | 1/80 | Cured; slight migration |
| 4 | paper | thin film | 0.6 | — | Cured; no migration, slight smear |
| 4 | paper | thin film | 0.48 | — | Undercured; slight migration |
| 5 | paper | thin film | 0.96 | — | Cured; no migration, slight smear |
| 5 | paper | thin film | 0.64 | — | Undercured; migrates |
| 5 | polypropylene | thin film | 1.28 | — | Poor cure; migrates, poor anchorage |
| 5 | polypropylene | 1 | 2.9 | — | Cured; no migration, but rubs off |
| 6 | paper | thin film | 0.96 | — | Cured; no migration, slight smear |
| 6 | paper | thin film | 0.64 | — | Undercured; migrates |

*Shadow set up across coating
**"thin film" is approximately 5 microns

The above data shows that $-D^{Vi}-$ units present in the base polymers appear to slow cure relative to $M^{Vi}-$ functional fluids. High Pt concentrations do not enhance cure so long as inhibitory concentrations of DIMAC are present.

EXAMPLE 4

This experiment is to verify that ultraviolet light without thermal assist will trigger cure of Pt/DIMAC addition cured systems. A low intensity ultraviolet light source, (UV Products, Inc. table top lamp, 115 volt, 0.35 amp.) was set up (unfocused) 1¾ inches away from an aluminum substrate having a 2 mil coating of bath composition 1. UV flux was determined to be 6 J/cm$^2$ hr. No significant difference could be detected between room temperature, 24° C., and the measured temperature of the substrate after 15 minutes exposure to the low intensity source. The coating cured to a smear-free well-anchored rubbery surface in about 2.5 hours exposure, i.e. 15 J/cm$^2$ total flux. This observation coupled with the Experiment 3 "shadow" observation confirms the ultraviolet light nature of this cure mechanism.

EXAMPLE 5

The pot life of bath compositions 1 and 3–6 was investigated by noting viscosity as a function of time at a given temperature. Table IV shows the time/viscosity relationship at 25° C.

TABLE IV

| Time, hr. | COMPOSITION, viscosity, cps. | |
|---|---|---|
| | 1 | 3–6 |
| 0 | 624 | |
| 2 | 686 | Gelled in less than 30 min. |
| 4 | 760 | " |
| 6 | 842 | " |
| 8 | 1025 | " |
| 24 | 9000 | " |

Table V shows the time/viscosity relationship at 4° C.

TABLE V

| Time, hr. | COMPOSITION, viscosity, cps. | | | |
|---|---|---|---|---|
| | 3 | 4 | 5 | 6 |
| 0 | 760 | 800 | 600 | 606 |
| 1 | 890 | 910 | 702 | 730 |
| 2 | 940 | 1115 | 860 | 882 |
| 3 | 1135 | 1300 | 980 | 1925 |
| 4 | 1240 | 1600 | 1200 | 1400 |

What is claimed is:

1. A process for rendering surfaces nonadherent to materials which would normally adhere thereto comprising the steps of:
   (A) Providing a silicone release coating composition by combining:
      (a) an olefinorganopolysiloxane having units of the structural formula:

$R_a R^1_b SiO_{4-a-b/2}$ (b) an organohydrogenpolysiloxane having units of the structural formula:

$R_a H_b SiO_{4-a-b/2}$ wherein R is selected from the group consisting of a monovalent hydrocarbon radical, a halogenated monovalent hydrocarbon radical, a cyanoalkyl radical and mixtures thereof, $R^1$ is an olefinic hydrocarbon radical, wherein a has a value of from 0 to 3, inclusive, b has a value of from 0.005 to 2.0, inclusive, and the sum of a and b is equal to from 0.8 to 3, inclusive;
      (c) a sufficient amount of a platinum metal catalyst to cause the co-reaction of (a) and (b); and
      (d) a dialkylacetylenedicarboxylate having the general formula:

ROOCC≡CCOOR where R is as defined above and wherein said dialkylacetylene-dicarboxylate is present in an amount effective for inhibiting premature gelation but insufficient for preventing cure at elevated temperature; wherein said silicone release coating has a viscosity of, approximately, 25 to 5000 centipoise at 25° C.;
   B. coating said silicone release coating on a suitable surface at a thickness of, approximately, 0.005 to 2.0 mils;
   C. curing said silicone release coating with an amount of ultraviolet light effective for overcoming the cure retarding properties of said dialkylacetylenedicarboxylate wherein the temperature of the coating during cure is maintained within a range which is insufficient to effect thermal cure of the coating.

2. A process as in claim 1 wherein said olefinorganopolysiloxane is a dimethylvinyl chainstopped dimethylmethylvinylpolysiloxane copolymer fluid having a viscosity of, approximately, 300 to 1000 centipoise at 25° C. and a vinyl content of, approximately, 0.1 to 25 weight percent.

3. A process as in claim 1 wherein said organohydrogenpolysiloxane is a trimethyl chainstopped methylhydrogenpolysiloxane fluid having a viscosity of, approximately, 10 to 500 centipoise at 25° C. and a hydrogen content of, approximately 0.1 to 1.67 weight percent.

4. A process as in claim 1 wherein said platinum metal catalyst is present in an amount sufficient to provide, approximately, 5 to 500 parts platinum metal per million parts of said olefinorganopolysiloxane.

5. A process as in claim 1 wherein said dialkylacetylenedicarboxylate is present in an amount of, approximately, 0.02 to 1.0 weight percent of the silicone coating composition.

6. A process as in claim 1 wherein said dialkylacetylenedicarboxylate is selected from the group consisting of dimethylacetylenedicarboxylate and diethylacetylenedicarboxylate.

7. A process as in claim 1 wherein the group of radicals represented by R also contains hydroxyl radicals.

8. A process as in claim 1 wherein said olefinorganopolysiloxane is a dimethylvinyl chainstopped dimethylmethylvinylpolysiloxane copolymer fluid having a viscosity of, approximately, 1,000 to 100,000 centipoise at 25° C.

* * * * *